(No Model.) 4 Sheets—Sheet 1.

F. WHITNEY.
PHOTOGRAPHIC CAMERA.

No. 430,794. Patented June 24, 1890.

Witnesses:
Frank S Blanchard
C W Whitney

Inventor
Frank Whitney (No Model.) 4 Sheets—Sheet 2.
F. WHITNEY.
PHOTOGRAPHIC CAMERA.
No. 430,794. Patented June 24, 1890.
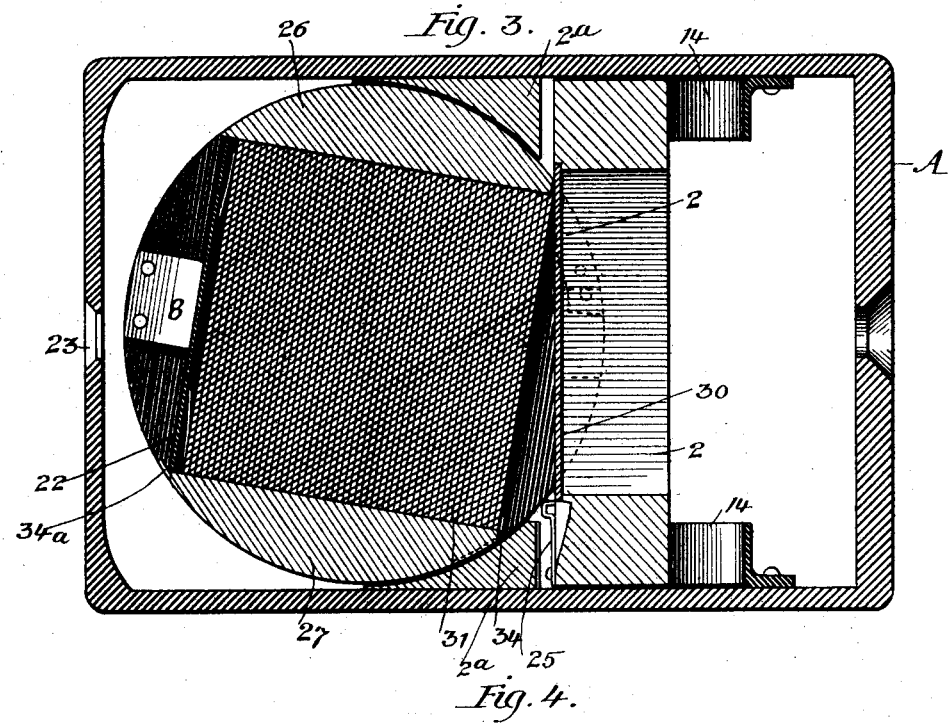
Fig. 3.
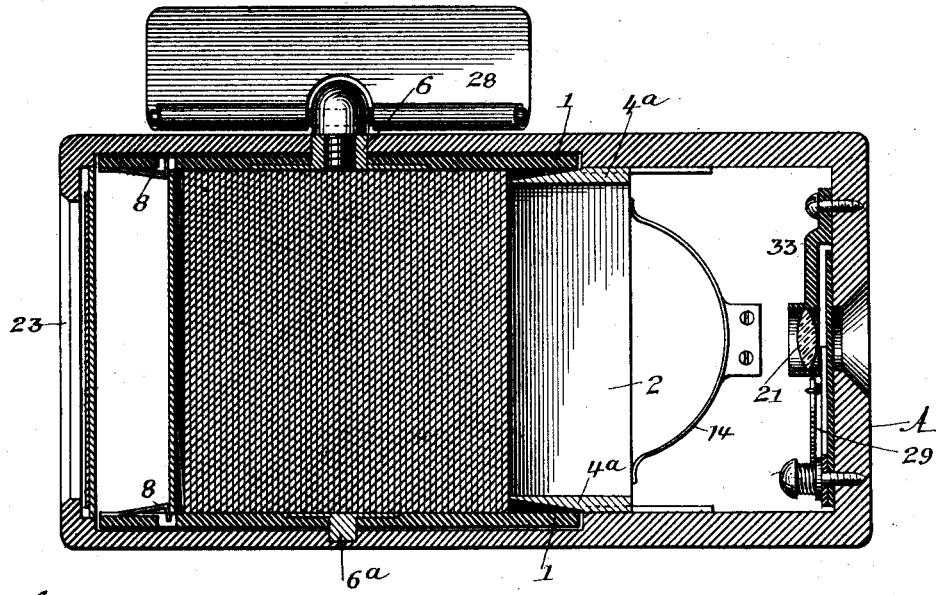
Fig. 4.
Witnesses:
Frank Blanchard
C. W. Whitney
Fig. 5.
Inventor:
Frank Whitney (No Model.) 4 Sheets—Sheet 3.
F. WHITNEY.
PHOTOGRAPHIC CAMERA.
No. 430,794. Patented June 24, 1890.
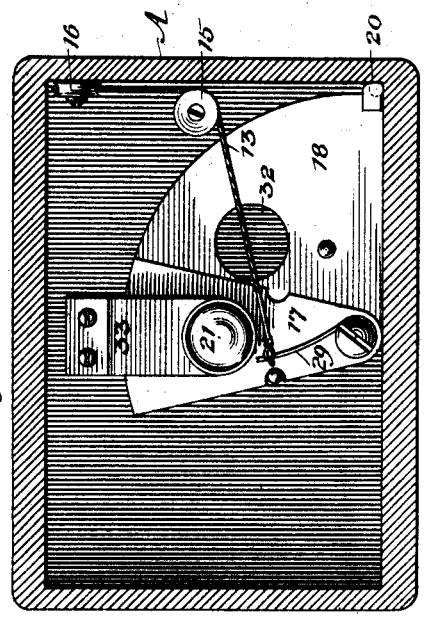
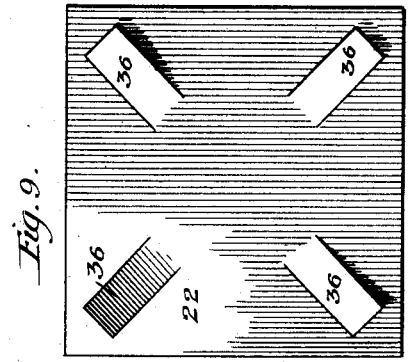
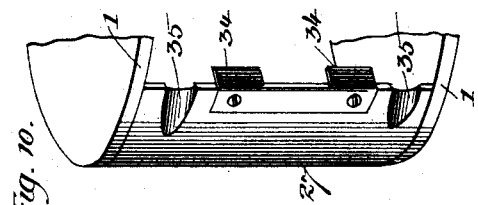
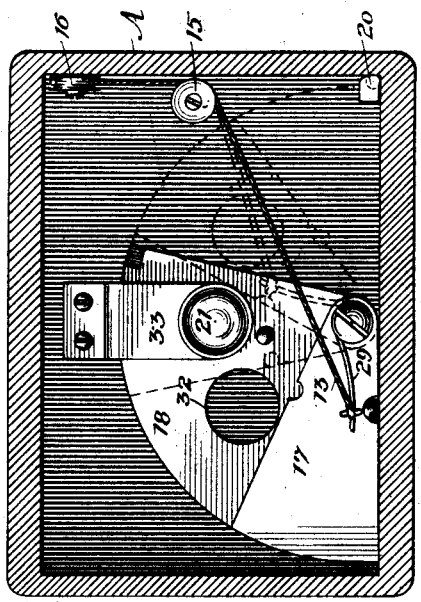
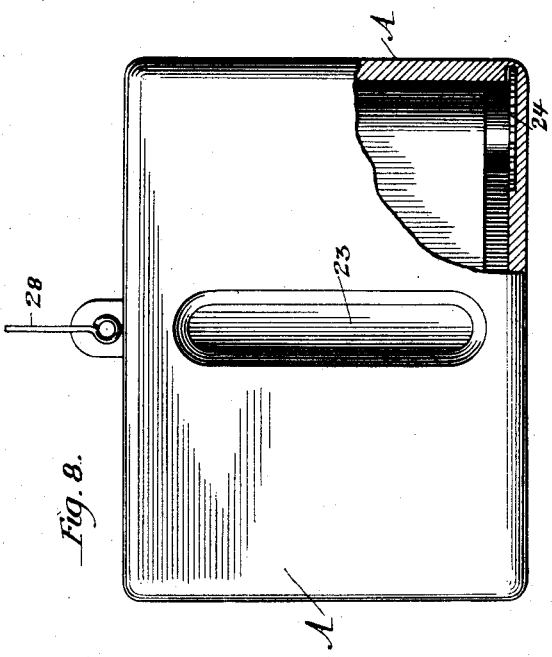
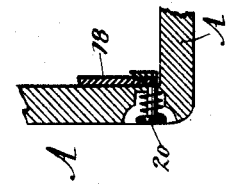
Witnesses:
Frank B. Blanchard
C. W. Whitney.
Inventor
Frank Whitney (No Model.) 4 Sheets—Sheet 4.

F. WHITNEY.
PHOTOGRAPHIC CAMERA.

No. 430,794. Patented June 24, 1890.

Witnesses:
Frank S. Blanchard
C. Whitney

Inventor:
Frank Whitney

UNITED STATES PATENT OFFICE.

FRANK WHITNEY, OF CHICAGO, ILLINOIS.

PHOTOGRAPHIC CAMERA.

SPECIFICATION forming part of Letters Patent No. 430,794, dated June 24, 1890.

Application filed March 21, 1889. Serial No. 304,137. (No model.)

*To all whom it may concern:*

Be it known that I, FRANK WHITNEY, a citizen of the United States, residing in the city of Chicago, in the county of Cook and State of Illinois, have invented new and useful Improvements in Photographic Cameras, of which the following is a specification.

This invention relates to photographic cameras provided with a magazine for holding a series of negative plates, and automatically operating a plate-holder, a shutter, and a registering-paper.

The object of my invention is to provide a camera containing a large number of negative plates, which are automatically placed in the holder for exposure and automatically taken therefrom, and to operate a shutter and a registering-paper, all of which is accomplished by revolving the negative-plate magazine and operating two spring-catches. In the arrangement and operation of these parts consist the novelty of my invention. These objects I accomplish in the manner and by the means hereinafter described and claimed, reference being made to the accompanying drawings, in which—

Figure 1:
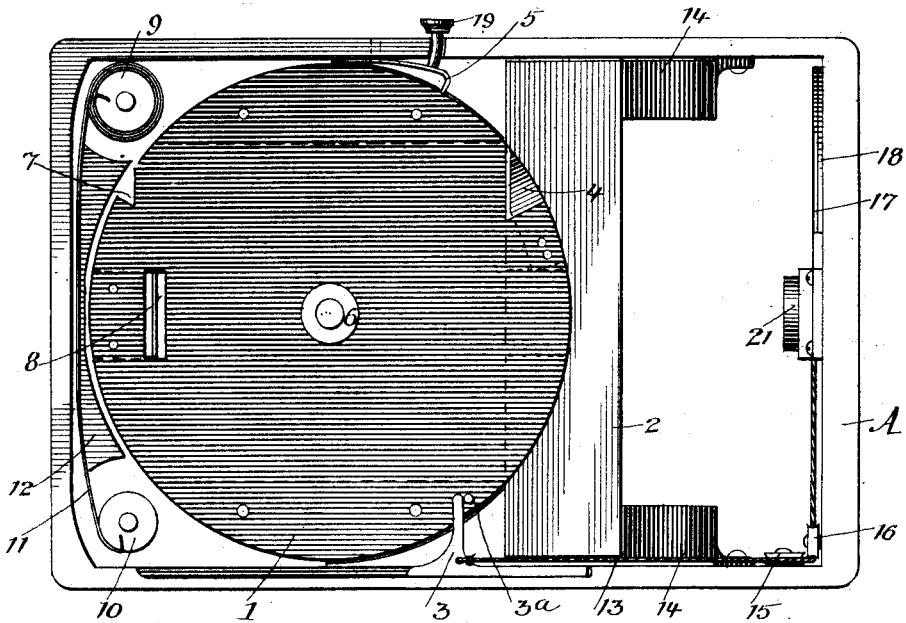
Figure 2:
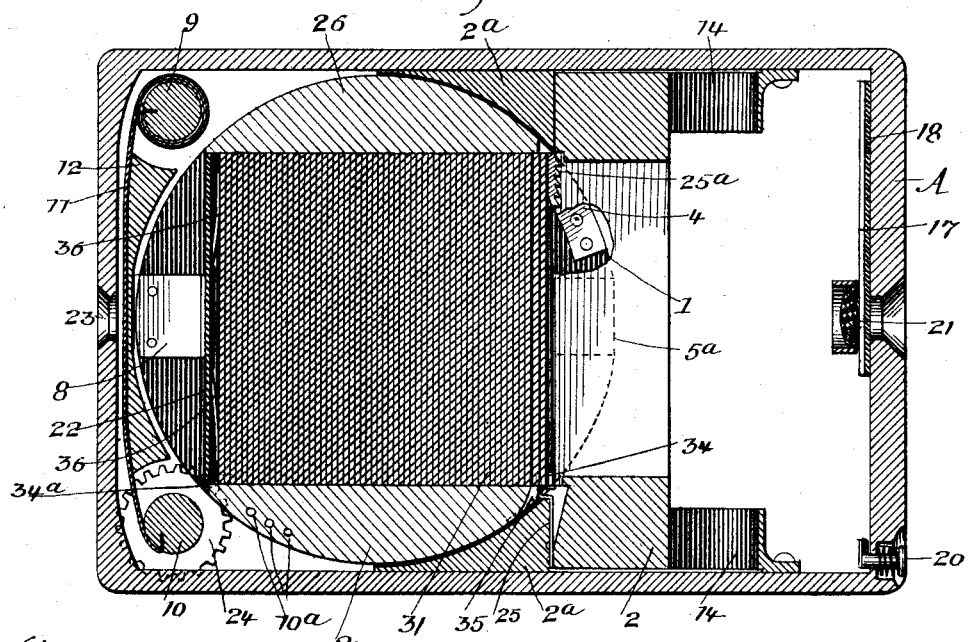
Figure 12:
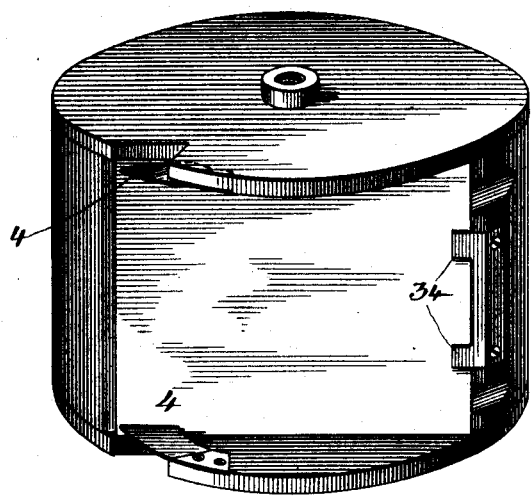
Figure 13:
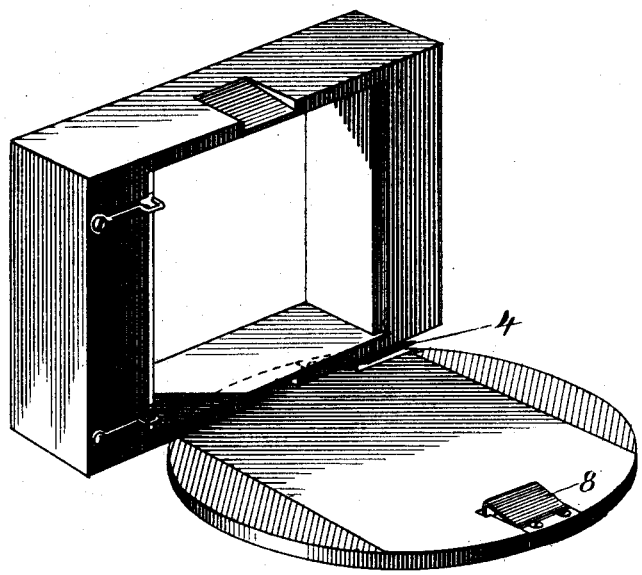

Figure 1 is a top plan view. Fig. 2 is a section showing the lower half of Fig. 1. Fig. 3 is a partial cross-sectional view. Fig. 4 is a side view in cross-section. Fig. 5 is a detail; Figs. 6 and 7, a view of front end from inside. Fig. 8 is a rear end view showing registering-slot. Fig. 9 is a spring press-plate; Figs. 10 and 11, details of revolving magazine and shutter-catch. Figs. 12 and 13 are detail drawings showing the magazine-disks and walls, with springs 4 and 8 and flanges 34.

In order to enable those skilled in the art to make and use my invention, I will now describe the same in detail.

Referring to the drawings, A indicates the box, which incases and forms supports for the various devices herein shown and described.

The numeral 1 indicates the top and bottom disks of the revolving plate-magazine, as shown in Figs. 1 and 4.

2 indicates a sliding plate-holder; 3, sliding pin attached to cord 13 and engaging with pin $3^a$.

4 is a spring-plate retainer at delivery side of magazine.

5 is a spring-catch, operating to stop the revolving magazine by engaging with notch 7.

6 and $6^a$ are top and bottom journals to the magazine, as shown in Figs. 1 and 4.

8 is a retaining-spring at receiving side of magazine. These springs 4 and 8 are operated by flanges on plate-holder, as shown at $4^a$ in Figs. 5, and $5^a$ and in dotted line in Fig. 2.

9 is a paper-roller, with the paper 11 extending to roller 10.

24 is a gear-wheel attached to the lower end of roller 10, engaging with the pins $10^a$, whereby a sufficient amount of paper is exposed at slot 23 for a new registration at each revolution of the magazine.

12 is a shield or guide between the paper and the magazine.

14 and 14 are the springs, which yield to permit the holder 2 to slide when the walls 26 and 27 come in contact with it, (see Fig. 3,) and also operate to force the plate-holder 2 up against the negative plates in the magazine, as shown in Figs. 1, 2, and 4.

15 and 16 are pulleys, over which the cord 13 passes, and 17 and 18 are the shutter-plates, to which the cord 13 is attached.

20 is the spring-catch for holding shutter-plates 18, as seen in Figs. 6, 7, and 11.

21 is the lens held in position by bracket 33, as shown in Figs. 6 and 7.

25 is a spring-catch attached to plate-holder 2.

28 is a hinged thumb-lever screwed into journal 6 of top disk.

29 are spring-operating shutter plates, as shown in Figs. 6, 7, and 4.

34 and 34 are plate-retaining flanges on 27.

35 and 35 are notches cut in wall 27, permitting catch 25 of plate-holder to pass, engaging with negative plate, as shown in Figs. 10 and 2.

The drawings herein described represent a full-sized camera complete for operation, with a capacity of from one to three hundred plates, the number depending upon the thickness, and the size used is two and one-half by two and one-half inches. I prefer celluloid plates. However glass or paper may be used, and in constructing the various devices may be made of any suitable well-known material. In capacity the registering device is abundant for one filling of the magazine.

In operating the camera I first turn the magazine until catch 5 enters the notch 7, then unscrew and remove the thumb-lever 28 and take off the cover of the box, which may be held on either by screws or latches, and then remove the top disk 1, which is also made portable by screws or pins. This leaves the negative magazine open and ready for filling. The space between the springs 8 and the springs 4 and flange 34 is then filled with negative plates, the spring press-plate Fig. 9 being the last is next to springs 8, and keep the negative plates compact, the film or sensitive side of the plates being the opposite side from the press-plate. I now replace disk 1 and put in position the roll of registering-paper 9, connecting the paper to roller 10. These rollers are held in position by journals at each end, which enter the top and bottom covers of the box, and are prevented from lost motion by a suitable spring for friction. (Not shown.) I now replace the box-cover and the thumb-lever. The camera is now loaded and ready for use. To make the exposure, I release spring 5 and turn the magazine to the right one revolution. In making this revolution one negative plate is left in the holder 2, as shown in Fig. 3, the catch 25 and the teeth 25ª engaging and stopping the plate while it is retained by the teeth and the catch, while the magazine continues until stopped by spring-catch 5 entering the notch 7. In this position the wall 26 is in front, covering the plate which is in the holder 2, and preventing light from passing through to the negatives in the magazine, the wall 26 being covered at each edge by the stationary walls 2ª. While the revolution of the magazine is being made the pin 3ª comes in contact with pin 3, carrying it until the shutter-plates are brought down and caught by spring-catch 20, as shown in Fig. 7. All is ready now for the exposure, which is made by pressing the spring-catch 20, thus releasing the shutter, which is thrown to position by spring 29, as shown in Fig. 6. In this movement hole 32 passes lens 21. This completes the exposure, and now I release catch 5 and turn the magazine one complete revolution, picking up the exposed plate by pressing it in beyond the springs 8 and leaving fresh plate in holder 2, and drawing the shutter-plates back to spring-catch, and while shutter-plates are being drawn back hole 32 is covered by plate 17. The registering-paper is drawn from roll 9 by wheel 24, which is attached to roller 10 by the pins 10ª in bottom disk. At each revolution of the magazine a sufficient space of paper is drawn to slot 23 for recording number of plate and name of subject.

What I claim is—

1. In a camera, the revolving negative magazine, in combination with the compressor-spring, substantially as and for the purpose described.

2. The automatically-operated plate-holder, in combination with the revolving magazine and the compressor-spring, substantially as and for the purpose described.

3. The automatically-operated registering paper and slot 23, in combination with the revolving magazine, substantially as and for the purpose described.

4. The automatically-operated shutter, in combination with the revolving magazine, sliding-pin 3, and cord 13, substantially as and for the purpose described.

5. The revolving negative-plate magazine, in combination with the automatically-operated plate-holder and the compressor-spring, substantially as described.

6. The revolving magazine, in combination with the automatically-moving registering-paper, substantially as and for the purpose described.

7. In combination with the revolving magazine, the shutter, the plate-holder, and the registering device, substantially as described.

8. The revolving magazine, in combination with the plate-holder and the registering device, substantially as and for the purpose described.

9. In a camera, the revolving negative-plate magazine constructed with the top and bottom disks and the walls supporting the disks and forming the square opening for plates, substantially as described.

10. In a camera, the revolving magazine with a square opening, containing negative plates, operating to deliver and receive on alternate sides, substantially as described.

11. In a camera, the revolving magazine containing the retaining-spring catches 4 and 8 for holding the plates in the magazine, substantially as described.

12. The springs 4 and 8 and flanges 34, in combination with the magazine, substantially as and for the purpose described.

13. The springs 4 and 8, in combination with the plate-holder, substantially as and for the purpose described.

14. The plate-holder 2, spring 25, and the teeth 25ª, in combination with the revolving negative-plate magazine, substantially as and for the purpose described.

15. The spring press-plate and the revolving magazine, in combination with spring 8 and spring 4 and flange 34, substantially as and for the purpose described.

In testimony whereof I affix my signature in presence of two witnesses.

FRANK WHITNEY.

Witnesses:
C. WHITNEY,
WM. G. DEALE.